US009866650B2

(12) United States Patent
Sathyanarayana et al.

(10) Patent No.: US 9,866,650 B2
(45) Date of Patent: Jan. 9, 2018

(54) STREAM MONITORING ACROSS A DISTRIBUTED PLATFORM

(71) Applicant: Verizon Digital Media Services Inc., Playa Vista, CA (US)

(72) Inventors: Karthik Sathyanarayana, Santa Monica, CA (US); Jonathan DiVincenzo, Santa Monica, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 437 days.

(21) Appl. No.: 14/559,584

(22) Filed: Dec. 3, 2014

(65) Prior Publication Data

US 2016/0164761 A1 Jun. 9, 2016

(51) Int. Cl.
*H04L 12/24* (2006.01)
*H04L 12/26* (2006.01)
*H04L 29/06* (2006.01)
*H04L 29/08* (2006.01)

(52) U.S. Cl.
CPC .......... *H04L 67/42* (2013.01); *H04L 41/046* (2013.01); *H04L 41/5038* (2013.01); *H04L 43/12* (2013.01); *H04L 65/4084* (2013.01); *H04L 65/60* (2013.01); *H04L 65/608* (2013.01); *H04L 65/80* (2013.01); *H04L 67/02* (2013.01); *H04L 41/509* (2013.01)

(58) Field of Classification Search
CPC ..... H04L 41/04–41/0654; H04L 43/00–43/50; H04L 65/00–65/80; H04L 67/00–67/42
See application file for complete search history.

(56) References Cited

U.S. PATENT DOCUMENTS

| | | | | |
|---|---|---|---|---|
| 6,625,648 | B1* | 9/2003 | Schwaller | H04L 12/2697 370/230 |
| 6,981,180 | B1* | 12/2005 | Bailey | H04L 41/145 714/38.11 |
| 7,318,107 | B1* | 1/2008 | Menon | G06F 11/2025 700/82 |
| 2005/0021274 | A1* | 1/2005 | Eden | G06F 11/3688 702/121 |
| 2007/0049990 | A1* | 3/2007 | Klostermann | A61N 1/37252 607/60 |

(Continued)

*Primary Examiner* — Clayton R Williams
(74) *Attorney, Agent, or Firm* — Los Angeles Patent Group; Arman Katiraei

(57) ABSTRACT

Some embodiments provide a system for simultaneously monitoring a content stream that is streamed using any of a plurality of streaming protocols from different points-of-presence (PoP) from within a distributed platform in real-time without the need for manual visual verification. The system is implemented with different emulation engines, each providing client-side player emulation for a different streaming protocol. The client-side player emulation involves requesting and downloading content stream chunks from a specified PoP according to the streaming protocol that is used by the distributed platform to stream the content stream under test. As part of the emulation, each instance inspects the downloaded chunks without decoding or rendering in order to track real-time performance and any errors in the server-side transmission of the content stream under test.

19 Claims, 8 Drawing Sheets

(56) References Cited

U.S. PATENT DOCUMENTS

| | | | |
|---|---|---|---|
| 2013/0019023 A1* | 1/2013 | Hemed | H04L 43/50 709/231 |
| 2014/0282792 A1* | 9/2014 | Bao | H04N 21/44004 725/116 |
| 2015/0049762 A1* | 2/2015 | Mantin | H04L 65/4076 370/390 |

\* cited by examiner

STREAM MONITORING ACROSS A DISTRIBUTED PLATFORM

BACKGROUND INFORMATION

A content delivery network (CDN) is one example of a distributed platform that hosts and serves content on behalf of various content providers. The CDN operates different sets of content caching and delivery servers at different points-of-presence (PoPs). The PoPs may redundantly cache the same content provider content at different network locations. The cached content can then be served from the PoPs in an optimized manner, whereby the PoPs serve the cached content to different sets of end users that are located closest to the PoP location. Moreover, the PoPs collectively form a large cooperative distribution network that is scalable to ensure quality of service when there are spikes in demand and when the network is under various attacks.

Ensuring the reliability and optimal performance of such a distributed platform is a significant undertaking. There are many complex factors involved in the real-time monitoring and error detection of such distributed platforms. One such factor is the sheer size of the distributed platform. The distributed platform operates multiple PoPs at different geographic locations with each PoP involving several servers providing cooperative content delivery. Each server typically serves different content to multiple users at any given time. It is not uncommon for such a distributed platform to simultaneously provide thousands of content streams to thousands of different users at any given time. This backdrop creates thousands of potential points of failure or error.

The complexity associated with delivering streaming content is another factor exacerbating the monitoring problem. Streaming content includes media content with any of audio, video, or interactive components. Monitoring streaming content, especially in a distributed platform, is difficult because the delivery of such content may involve different control plane and data plane packets as well as an ongoing coordinated dialog between the server and user client throughout the duration of the content stream. Moreover, the coordinated dialog changes for every streaming protocol that the distributed platform supports. The control plane packets attempt to provide a seamless playback of the content stream on the user device at the best possible quality based on several factors including the device's buffer, device's capabilities/resources, and network congestion as some examples. Accordingly, effective monitoring of streaming content involves more than ensuring receipt of the streaming content. It involves ensuring that the dialog between the client and server adapts the underlying transmission protocol according to the conditions of and between the client and the server.

This added complexity and the lack of adequate streaming monitoring tools for a distributed platform has made manual visual verification the default method with which to monitor the distributed platform's ability to deliver various content streams. A tester requests a stream under test and verifies its delivery by viewing the streaming content on his device. Clearly, manual visual verification is tenuous and unmanageable in the context of a distributed platform whereby the same streaming content is available from multiple PoPs, each PoP being a potential point of failure and with the distributed platform being tasked with the delivery of several thousand different content streams over different streaming protocols at any given moment. The alternative is for the distributed platform to defer to a reactive methodology, whereby the distributed platform publishes a content stream and relies on users that request the stream to notify the distributed platform of any issues related to the stream delivery. Once notified of an issue, the distributed platform can reactively address any identified issues.

There is therefore a need for a monitoring solution that proactively and effectively monitors and reports on the delivery of content streams using any of several streaming protocols from multiple locations within a distributed platform. More specifically, there is a need for a distributed platform monitoring solution that simultaneously monitors content streams from different network locations in real-time to detect any errors associated with the stream transmission and to provide alerts of any detected errors so that they may be resolved prior to affecting the quality of service to the distributed platform's users.

BRIEF DESCRIPTION OF THE DRAWINGS

A preferred embodiment for a distributed platform content streaming monitoring system will now be described, by way of example only, with reference to the accompanying drawings in which.

DETAILED DESCRIPTION OF PREFERRED EMBODIMENTS

Figure 1:
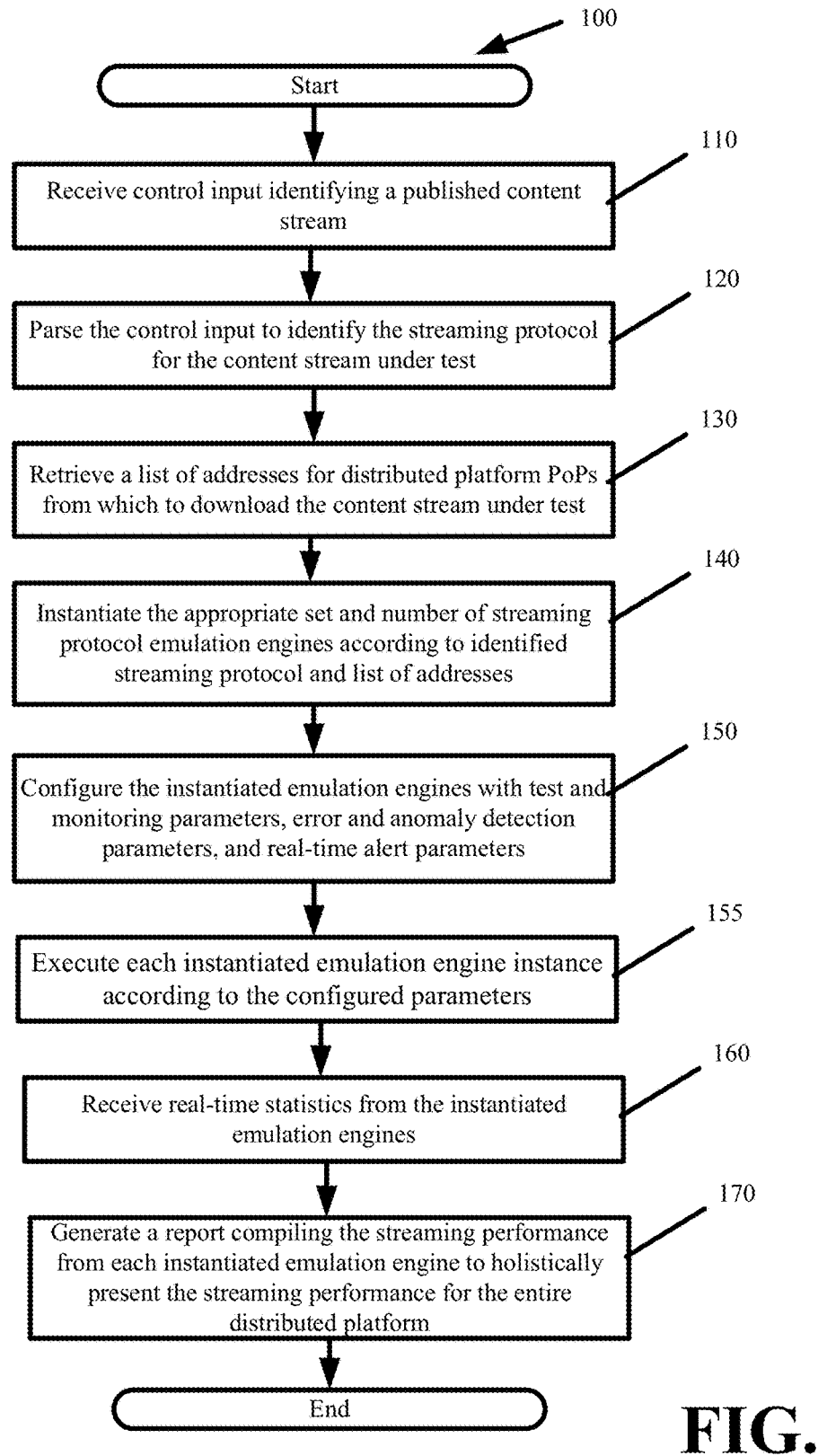
FIG. 1 presents a process performed by the system of some embodiments for monitoring multiple content streams simultaneously from different points-of-presence (PoP) of a distributed platform in real-time without the need for manual visual verification.

Some embodiments provide a system for monitoring multiple content streams, whether live or on-demand, simultaneously from different points-of-presence (PoP) from within a distributed platform in real-time without manual visual verification. The system monitors the content streams by emulating the client-side request and playback procedures for any of several different streaming protocols with any of several different distributed platform PoPs. The client-side player emulation reduces processing and memory overhead associated with such monitoring by verifying the server-side transmission from each distributed platform PoP without decoding or rendering the received content streams.

In some embodiments, the system includes a set of emulation engines. Each emulation engine of the set of emulation engines operates as a virtual player that performs the client-side player emulation for one HyperText Transfer Protocol (HTTP) based streaming protocol such as HTTP Live Streaming (HLS), HTTP Dynamic Streaming (HDS), and HTTP Smooth Streaming (HSS) or one Real Time Message Protocol (RTMP) based streaming protocol. Each emulation engine further operates to monitor streaming performance and detect errors or anomalies in the server-side transmission of a content stream passed according to the streaming protocol supported by the emulation engine. It should be apparent that the client-side player emulation and monitoring can be extended to other streaming protocols in addition to or instead of the HTTP and RTMP based streaming protocols enumerated herein.

To monitor a particular content stream, the system spawns an emulation engine instance for each distributed platform PoP from which that particular content stream is deliverable. Each emulation engine instance acts as a virtual player that is dedicated to client-side player emulation and monitoring of a content stream from a particular location within the distributed platform. Collectively, the spawned emulation engine instances simultaneously monitor streaming performance of the particular content stream from across the distributed platform while identifying any errors that may occur from any of the streaming nodes. Each emulation engine instance provides real-time updates regarding the particular content stream it is downloading and monitoring. The updates are logged or passed to and presented through a central interface. From the central interface, an administrator can identify real-time streaming performance from all across the distributed platform as well as identify in real-time any errors or anomalies that are detected and where within the distributed platform those errors or anomalies occur. The administrator can then take proactive action to ameliorate any issues prior to those issues affecting the end user experience. Each emulation engine instance can also be configured with one or more alerts. The alerts automatically notify a system administrator or any other party if and when an error or anomaly associated with an alert is detected. Each alert can be configured with a different set of parameters or conditions that cause the alert to trigger, thereby allowing a tester to set different alerts for different content streams or different PoPs.

In some embodiments, the system can be configured to continually or repeatedly monitor one or more content streams across the distributed platform. This regular monitoring ensures the performance and health of the content streams throughout the time they remain downloadable or deliverable from the distributed platform. In this manner, the system ensures that the content stream is being properly delivered throughout the time the content stream is available for delivery from the distributed platform. In other words, the administrator need not regularly schedule tests to monitor the different content streams.

Some embodiments automatically configure monitoring for a content stream at the time the content stream is newly published to the distributed platform for delivery. In doing so, the entire monitoring configuration and monitoring of the content stream is performed automatically. Administrators can alternatively identify a content stream to monitor and the system automatically instantiates the proper emulation engines to monitor the identified content stream from each distributed platform delivery node.

The system provides oversight over the streaming performance of all content streams from all delivery nodes of the entire distributed platform irrespective of the streaming protocol used in transmitting those streams. For a distributed platform that supports delivery of multiple streaming protocols, delivery from several PoPs, and delivery of several streams, the system provides a solution to an otherwise monumental task of manual or visual verification. Since the monitoring results are available in real-time and conditions can be configured to identify errors or anomalies therein, the system facilitates a proactive methodology with which to address any errors or anomalies. Specifically, users can leverage the monitoring results to identify isolated errors that affect one of several delivery nodes delivering a particular content stream and take steps to remedy the errors.

FIG. 1 presents a process 100 performed by the system of some embodiments for monitoring multiple content streams simultaneously from different points-of-presence (PoP) of a distributed platform in real-time without the need for manual visual verification. The process commences when the system receives (at 110) control input.

The control input identifies a content stream under test. The control stream under test is a content stream that is published to and made available for streaming from the different distributed delivery nodes of the distributed platform. The distributed delivery nodes include content streaming servers that operate in different PoPs of the distributed platform. Such an architecture is common within a Content Delivery Network (CDN), wherein the same published content stream is cached and served from servers operating within two or more geographically separated PoPs of the CDN.

In some embodiments, the control input is specified as a Uniform Resource Locator (URL). The URL can mirror the URL with which a user requests the content stream from the distributed platform. The URL may specify a path to where the content stream is located in the distributed platform and an identifier or name identifying that content stream. The URL will typically be agnostic as to the distributed platform PoP from which the content stream will be delivered. In such cases, the distributed platform employs a traffic management scheme (e.g., Domain Name System (DNS) routing or Anycast routing) to route the request to a PoP that can optimally serve the content stream to the requesting user. As will become apparent below, the system overrides the traffic management scheme so that the content stream is simultaneously downloaded and monitored from two or more, and preferably each and every, distributed platform PoP or node where the content stream is available for download. The content stream identified by the control input can be any of a live or on-demand content stream providing any of audio, video, or interactive content. In some embodiments, the control input can also specify test and monitoring parameters, error and anomaly detection parameters, and alert parameters. The parameters are discussed further below as part of the emulation engine instantiation and configuration.

In some embodiments, the system is automatically provided with control input identifying a particular content stream whenever a content provider publishes that particular content stream to the distributed platform for delivery. Alternatively, the system can automatically provide control input identifying a particular content stream whenever the distributed platform configures one or more PoP content streaming servers for delivery of that particular content stream. Using a system interface, system administrators, content providers, and other distributed platform customers can also manually configure the control input identifying a particular content stream whenever monitoring of that particular content stream is desired. The system interface can be accessible using any browser or application running on a device with network connectivity.

The process parses (at 120) the control input in order to identify the streaming protocol used in transferring the content stream under test. In some embodiments, the streaming protocol can be one of HLS, HDS, HSS, or RTMP as some examples. The identification can be based on the file extension of the content stream filename or some other identifier within the URL path. The parsing and identification is performed in order for the system to identify which streaming protocol emulation engine (e.g., HLS, HDS, HSS, RTMP, etc.) to instantiate.

To determine the number of instances of the identified streaming protocol emulation engine to instantiate, the process retrieves (at 130) a list of addresses for the distributed platform PoPs. This list identifies the content streaming nodes of the distributed platform where the content stream identified by the control input is available for streaming from within the distributed platform. The list can provide Internet Protocol (IP) or virtual IP (VIP) addresses for each of the distributed platform PoPs or servers within each PoP that are designated to deliver the content stream at issue. Alternatively, the list can provide different URLs for obtaining the content stream from different distributed platform PoPs. For example, a first URL cdn.net/hds-live/20A802/losangeles/movie.f4m can be used to request a content stream from a first distributed platform location while a second URL cdn.net/hds-live/20A802/newyork/movie.f4m can be used to request the same content stream from a different second distributed platform location. In any case, by obtaining the address list, the monitoring system can directly request the content stream from any PoP it chooses, thereby bypassing the traffic management scheme that would otherwise route a user request to a PoP that is deemed optimal for that user. The list can alternatively provide addressing for all PoP locations regardless of whether or not the control input identified content stream is available from each of those PoPs. In such cases, the resulting monitoring report will identify all PoPs and which of those PoP the content stream is available from. The distributed platform maintains the address list at an administrative or control server based on configuration deployments and repeated health checks of the distributed platform PoPs and servers. The monitoring system can also maintain the list when the distributed platform PoPs and servers are configured to periodically provide a health check to the monitoring system and/or other administrative or control server.

Once the system is aware of the streaming protocol for the content stream under test and addressing for the distributed platform content streaming nodes, the process (at 140) instantiates for each content stream node, one instance of the emulation engine for the identified streaming protocol. In some embodiments, instantiating a streaming protocol emulation engine instance involves creating a new thread or process for that instance, wherein the new thread or process runs in parallel with other instantiated instances as part of the overall monitoring system. For instance, when the control input identifies the content stream under test as an HLS stream and the list of distributed PoPs identifies five addresses for where the HLS content stream is available for streaming from within the distributed platform, the process will instantiate five instances of the streaming protocol emulation engine performing client-side player emulation of the HLS streaming protocol. As part of the instantiation, the process configures each of the five HLS streaming protocol emulation engines with a different address to one of the five PoPs. The address notifies the emulation engine which PoP it is to request, receive, and monitor the particular content stream from. As part of the instantiation, the process also configures each of the emulation engines with the identifier identifying the content stream under test. This can include providing each emulation engine with the control input URL.

As noted above, the control input may also include various parameters that control how the testing should be conducted. Accordingly, the process may also involve configuring (at 150) the instantiated emulation engine instances with test and monitoring parameters, error and anomaly detection parameters, and alert parameters that are specified as part of the control input. All such parameters can be set by an administrator, content provider, or other user using a system interface that is accessible from a browser or other application. The test parameters can be embedded as query string arguments of the control input URL and can be relayed to the instantiated emulation engine using either the control input URL or a configuration file that is created as a result of parsing the parameters from the control input URL.

The test and monitoring parameters control the monitoring duration and monitoring interval as well as what parameters the emulation engine instances monitor during a content stream download. Some parameters that can be monitored include latency, throughput, packet loss, number of retries, bytes downloaded during download duration, maximum download speed, minimum download speed, average transfer rate/bandwidth, jitter, number of manifests downloaded, number of fragments (i.e., chunks) downloaded, fragment duration, time to download each fragment, fragment type (e.g., live or on-demand), and server cache hit ratio. By configuring the monitoring duration, the emulation engine instances can monitor a content stream without downloading the entire stream. For example, a content stream may have a two hour duration. However, the emulation engine instances can be configured to monitor only a five minute interval. The test and monitoring parameters can also be used to specify a one-time test whereby each instantiated emulation engine instance submits a single request for a content stream and monitors the response to that request. After the response is complete, the test is complete and that instance of the emulation engine terminates. Alternatively, the test and monitoring parameters can be used to specify a recurring test whereby each instantiated emulation engine instance periodically requests a content stream and monitors the server's response to those requests. For example, the distributed platform may provide a live stream that spans several hours. Test parameters can be configured to request one minute chunks of the live stream every hour.

The error and anomaly detection parameters configure the thresholds and conditions that determine an error or anomaly in the transmission of a content stream. By configuring different error and anomaly detection parameters for different instances of an emulation engine, the error and anomaly detection can be made to differ for different content streams under test and for different PoPs being monitored. In other words, each instantiated emulation engine can be configured to detect a different set of errors or anomalies according to a different set of criteria. In some embodiments, a latency threshold can be set as an error and anomaly detection parameter such that an error is reported by a configured emulation engine instance when a stream chunk is requested and not received within the amount of time specified by the latency threshold. Other configurable error and anomaly parameters can include specifying an acceptable amount of packet loss, an acceptable amount of out-of-order or out-of-sequence packets, and an acceptable number of retries as some examples.

The alert parameters configure when alerts are issued, what information is included in each alert, and the recipients for each alert. For example, a first set of alert parameters can configure a first emulation engine instance to issue an alert when latency on a first content stream exceeds 50 milliseconds and a second set of alert parameters can configure a second emulation engine instance to issue an alert when latency on a second content stream exceeds 75 milliseconds. Based on the alert parameters, each alert can identify the distributed platform delivery node in which the error occurred, the error at issue, the content stream fragment or chunk where the error or anomaly occurred, various other performance metrics at the time of the error occurrence, and one or more parties that receive the alert.

In some embodiments, the system configures each instantiated emulation engine with a default set of test and monitoring parameters, error and anomaly detection parameters, and alert parameters when the tester does not customize the parameters. The default parameters can vary depending on the streaming protocol used for the content stream under test or can vary depending on the content stream itself. The default parameters can be overridden or added to by user specified parameters. The default parameters provide a baseline set of metrics and errors to monitor. The default parameters can also configure a set of automatic alerts. These default alerts may fire whenever a serious error is detected in the transmission of a content stream.

With the emulation engine instances instantiated and configured, the process next involves executing (at 155) each instance according to the configured parameters. Execution involves each emulation engine instance requesting the content stream under test from a specified distributed platform node and performing client-side player emulation for receiving the server-side transmitted content stream according to the identified streaming protocol. As part of the client-side player emulation, each emulation engine instance monitors streaming performance and tracks any error or anomalies occurring within the server-side transmission.

During the client-side player emulation performed by the instantiated emulation engine instances, the process receives (at 160) real-time statistics from the emulation engine instances. The statistics identify streaming performance from each distributed platform's different delivery node being monitored as well as any errors or anomalies that were identified during the client-side player emulation. The process generates (at 170) a report compiling the streaming performance from each instantiated emulation engine to holistically present the streaming performance for the entire distributed platform.

In some embodiments, the instantiated emulation engine instances write any statistics, errors, or anomalies tracked during the client-side player emulation to a common log file as the statistics, errors, or anomalies occur or are detected. In other words, all instantiated emulation engine instances continually write to the same log file and the system continually reads from the common log file in order to update and generate the compiled report in real-time. In some embodiments, each instantiated emulation engine instance continually writes any statistics, errors, or anomalies tracked during the client-side player emulation to a different log file with the system continually aggregating the entries from the log files of all instantiated emulation engine instances in order to update and generate the compiled report in real-time.

Figure 2:
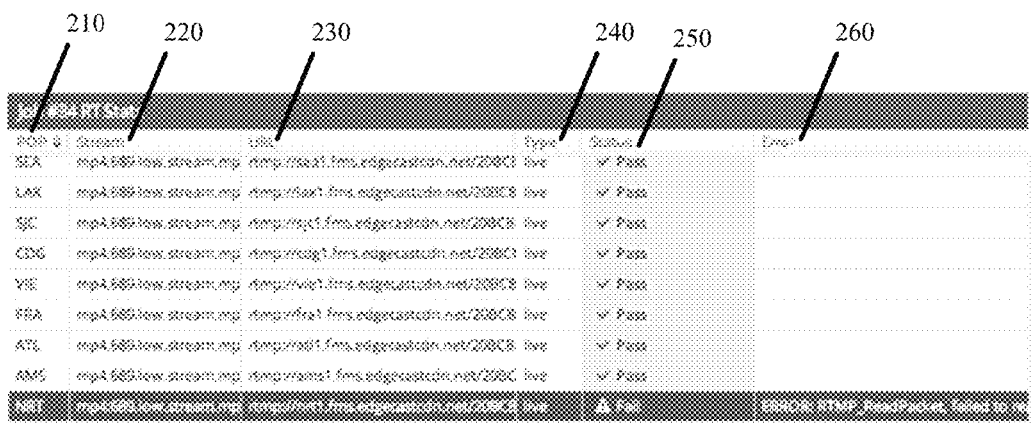
FIG. 2 illustrates an exemplary interface that presents various information as a result of monitoring a content stream from each of the distributed platform's PoPs.

The report can be presented through an online interface with the interface being updated as the emulation engine log files are themselves updated. FIG. 2 illustrates an exemplary interface that presents the distributed platform PoPs from which a content stream is monitored 210, the content stream under test 220, the URL for requesting the content stream under test 230, the type of content stream under test 240 (i.e., live or on-demand), status of the test 250, and any errors or anomalies detected while downloading the content stream from each of the PoPs 260.

Figure 3:
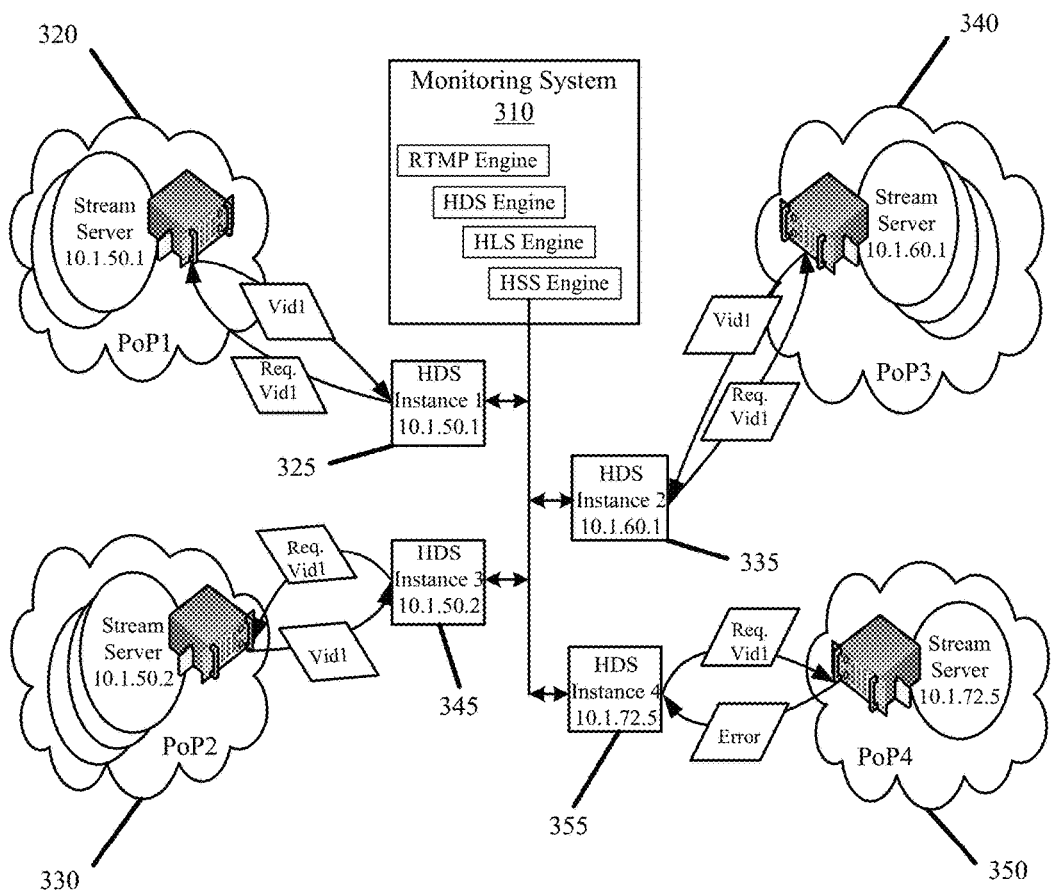
FIG. 3 illustrates the simultaneous monitoring of the same content stream from different distributed platform delivery nodes using different streaming protocol emulation engine instances, wherein each emulation engine instance is configured to monitor streaming performance provided by a different delivery node of the distributed platform.

FIG. 3 illustrates the simultaneous monitoring of the same content stream from different distributed platform delivery nodes using different streaming protocol emulation engine instances, wherein each emulation engine instance is configured to monitor streaming performance provided by a different delivery node of the distributed platform. The figure illustrates four distributed platform PoPs 320, 330, 340, and 350 and the monitoring system of some embodiments 310.

From each of the PoPs 320, 330, 340, and 350, the distributed platform delivers different content provider content to different sets of users. Each PoP 320, 330, 340, and 350 further includes a streaming server that delivers a particular content stream using a particular streaming protocol (i.e., HDS).

The monitoring system 310 instantiates four emulation engine instances 325, 335, 345, and 355 to monitor streaming performance of the particular content stream from each of the four PoPs 320, 330, 340, and 350. As part of the instantiation, the monitoring system 310 configures emulation engine instance 325 with addressing for the PoP 320 streaming server so that instance 325 is configured to monitor delivery of the particular content stream using the particular streaming protocol from PoP 320. Similarly, the monitoring system 310 configures emulation engine instance 335 with addressing for the PoP 330 streaming server, emulation engine instance 345 with addressing for the PoP 340 streaming server, and emulation engine instance 355 with addressing for the PoP 350 streaming server. The instances 325, 335, 345, and 355 then engage in the streaming protocol dialog with the delivery node they were configured to monitor, wherein, as part of the dialog, the emulation engines 320, 330, 340, and 350 request and receive the configured content stream while monitoring the streaming performance.

Figure 4:
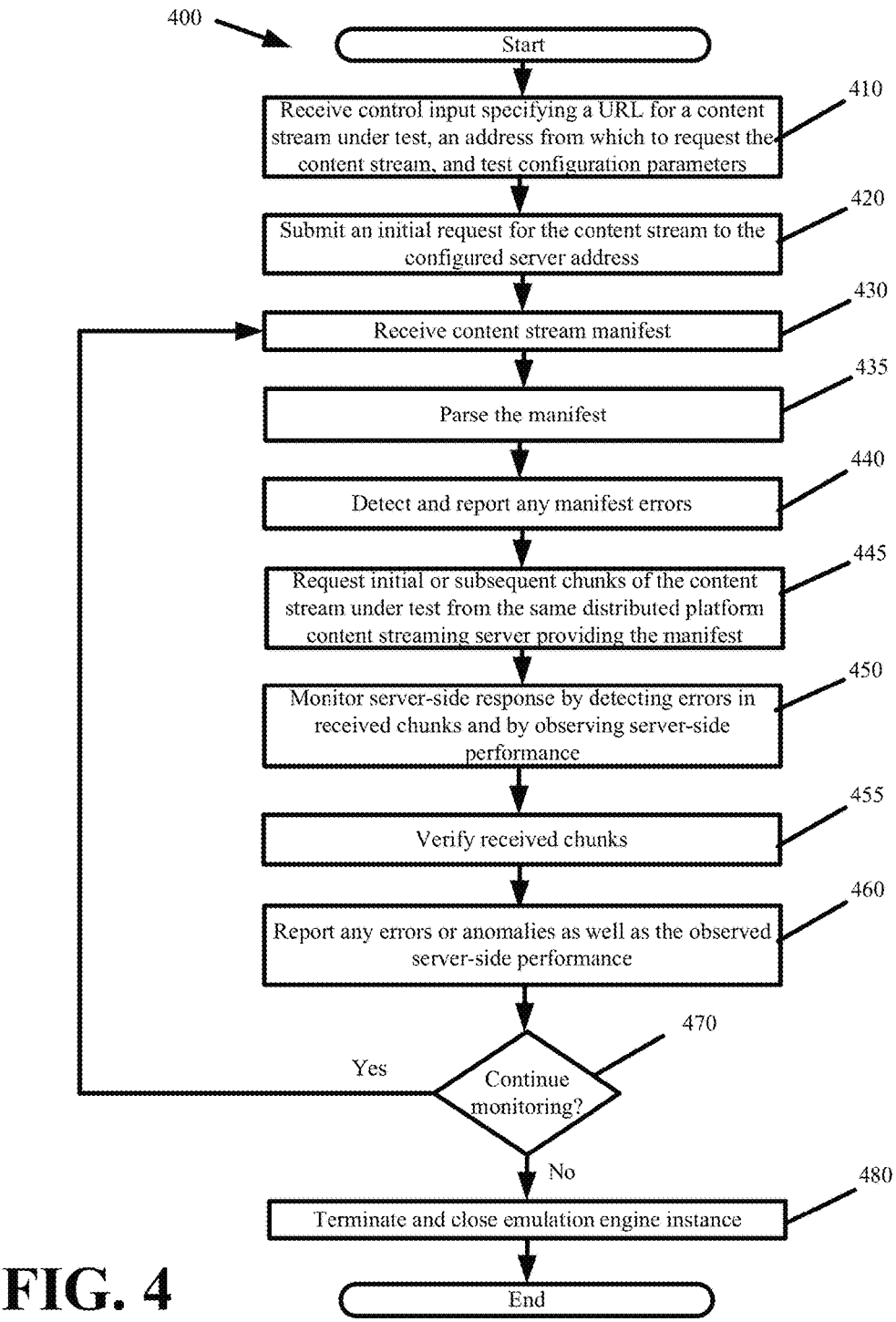
FIG. 4 presents a process by which an emulation engine instance monitors a content stream in accordance with some embodiments.

FIG. 4 presents a process 400 by which an emulation engine instance monitors a content stream in accordance with some embodiments. The process 400 commences upon instantiation and configuration of the emulation engine. As such, the process begins by at least receiving (at 410) control input specifying a URL for a content stream under test, an address of either a specific distributed platform content streaming server or a specific distributed platform PoP, and test configuration parameters.

The process submits (at 420) a request for the content stream directly to the address. The request is submitted according to the streaming protocol controlling the transfer of the content stream. The request for the content stream typically begins with a request for the content stream manifest. Different streaming protocols have different manifests. For example, the HLS streaming protocol manifest is specified as a file with the .m3u8 extension and the HDS streaming protocol manifest is specified as a file with the .f4m extension.

In response to the request, the process receives (at 430) a manifest and, optionally depending on the streaming protocol, an initial chunk of the content stream. The manifest may be provided separate from or within headers of packets encoding an initial chunk of the content stream.

At this stage, the client-side player emulation performed begins. The process parses (at 435) the manifest. As a content stream is encoded and divided into different chunks or segments, the process parses the manifest in order to identify which chunks or segments should be downloaded next to continue the content stream sequence. Manifest parsing also identifies other information about the content stream including the codecs that were used to encode the content and which bit rates and resolutions are available for a multi-bitrate encoded stream. As part of the parsing, the process detects and reports (at 440) any manifest errors. This can include detecting and reporting errors that prevent the continuous playback of the content stream according to the streaming protocol at issue including manifest formatting errors, missing manifest fields, invalid values for any manifest fields, and inconsistency between the current manifest and a prior manifest received for the same content stream. The process can optionally monitor and report on performance statistics related to the manifest. In some embodiments, the reporting involves tracking any errors, warnings, debugging information messages, and performance statistics to a log. The reporting can alternatively or additionally provide the errors, warnings, messages, and performance statistics in a real-time fashion. This two-phase reporting function will be described in detail below.

Based on the manifest parsing, the process then requests (at 445) initial or subsequent chunks of the content stream under test from the same distributed platform content streaming server providing the manifest. For an on-demand content stream under test, chunks are typically requested from the start and continued in sequential order. For a live content stream, the current playback chunk is requested.

The process continues the client-side player emulation by monitoring (at 450) the server-side response to the requests. If the requested chunks of the content stream under test are timely received, the process tracks the server-side performance in delivering those chunks while also providing any acknowledgements to the server (if acknowledgements are part of the streaming protocol). If chunks are not timely received, the client-side player emulation may involve requesting retransmission of those chunks.

The process then verifies (at 455) any received chunks. Chunk verification involves inspecting the received chunks for errors or anomalies including invalid checksums, improper metadata or header information, and malformed payloads as some examples. The detected errors and anomalies can vary depending on the streaming protocol with which the content stream under test is passed. For instance, in the emulation of an HLS content stream, the process inspects received chunks for HLS errors, download status, fragment details (e.g., duration, size, etc.), and cache hit ratio. Chunk verification also involves reordering chunks that are received out-of-order in order to verify that all requested chunks were in fact received. Chunk verification also involves verifying the tracked server-side performance to ensure that the requested chunks arrive in a timely fashion that provides seamless playback if the chunks were to be rendered. Specifically, the emulation engine tracks the rate at which the chunks arrive to determine the delay between chunks, the burst rate, amount of buffering needed, etc.

To minimize the resource and processing overhead associated with performing the chunk verification, it should be noted that the emulation engine instances of some embodiments do not decode or render the content stream chunks as they are received. By eliminating the decoding and rendering steps, the monitoring system is able to minimize its resource usage for each monitored content stream, thereby allowing the monitoring system to monitor many more content streams in parallel than it would otherwise be able to if its resources were consumed in decoding and rendering the monitored content streams.

The process reports (at 460) any errors or anomalies as well as the observed server-side performance. The reporting can include logging and/or providing real-time statistics regarding any detected errors or anomalies and observed server-side performance. The real-time statistics can include directly notifying an administrator, content provider, or other user based on any configured alerts that are triggered as a result of detected errors, anomalies, or monitored server performance.

Based on the configured testing parameters, the process determines (at 470) whether to continue monitoring the content stream under test. If monitoring is not to continue, the process terminates (at 480) and closes the emulation engine instance for which monitoring has ended. If monitoring is to continue, the process continues the client-side player emulation by requesting subsequent chunks of the content stream under test in sequence at a staggered rate that reflects playback of the chunks. In other words, the emulation engine does not request all chunks at once from the server, but staggers the request rate to mimic how an actual client application would request next chunks as it renders received chunks. Subsequent chunks can be requested using the current manifest or awaiting receipt of a subsequent manifest per step 430.

Figure 5:
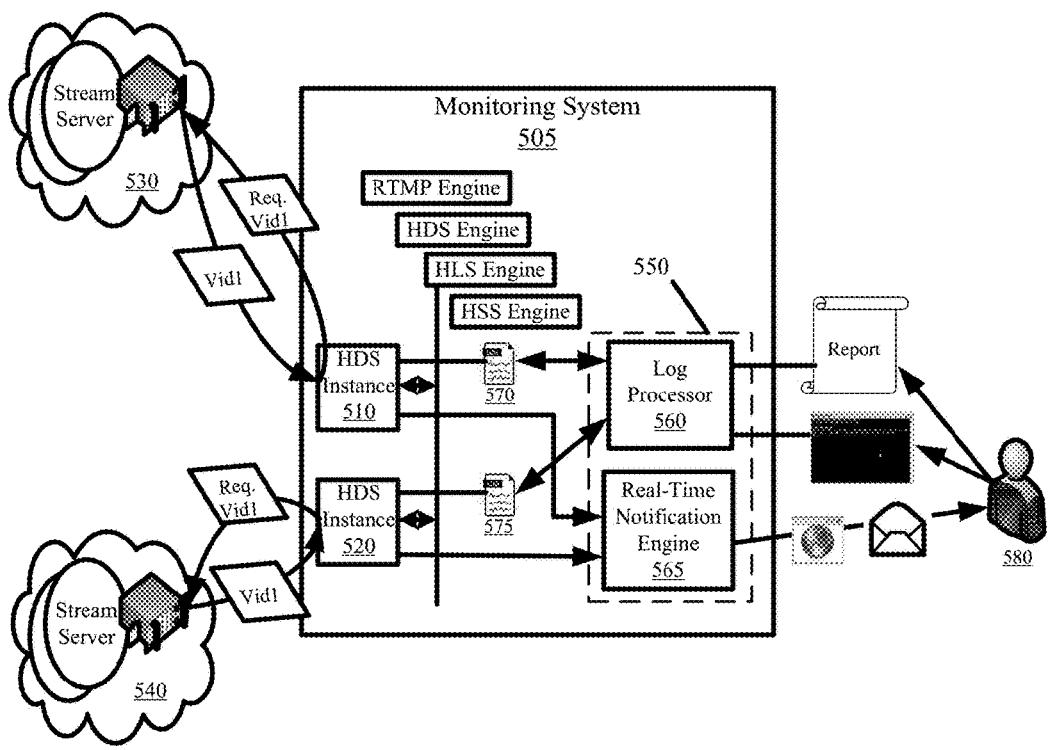
FIG. 5 conceptually illustrates the two-part error and performance reporting function of some embodiments.

FIG. 5 conceptually illustrates the two-part error and performance reporting function of some embodiments. The figure depicts two emulation engine instances 510 and 520 that have been instantiated by a monitoring system machine 505 to test a content stream from two different distributed platform delivery nodes 530 and 540. The figure also depicts a logging engine 550 that may execute on the same monitoring system machine 505 as the instantiated emulation engine instances 510 and 520. The logging engine 550 includes a log processor 560 and a real-time notification engine 565.

As part of the first part of the two-part reporting function, the two emulation engine instances 510 and 520 track any detected errors or anomalies and observed performance statistics for the content stream under test to their own respective log files 570 and 575. In some other embodiments, each emulation engine instance 510 and 520 writes to a shared log file for the content stream under test. The log processor 560 periodically aggregates the log files 570 and 575 that are associated with any content stream under test in order to make the logged entries from those log files available to user 580 in a single report or through a single console interface. In this manner, the logging engine 550 holistically presents the content stream performance from across all distributed platform delivery nodes under test.

As part of the second part of the two-part reporting function, the real-time notification engine 565 provides the user 580 with real-time notification of errors or anomalies and performance statistics as they occur when testing the distributed platform delivery nodes 530 and 540. Here, the logging engine pushes real-time updates to the user 580 rather than wait for the user 580 to pull the logs. The real-time notification engine 565 may be user configurable. In other words, the user 580 can specify which errors or performance statistics he would like to be notified of in real-time. The emulation engine instances 510 and 520 detect when any of the specified errors or performance statistics occur during the test. The emulation engine instances 510 and 520 then pass the detected error or performance statistics as a shared data structure to the real-time notification engine 565 which then pushes the notifications to the user 580. In some embodiments, the real-time notification engine 565 operates as an HTTP server that provides the updates to the user 580 through a web browser. In some other embodiments, the real-time notification engine 565 provides the real-time updates using other communication mediums including text message and email.

In some embodiments, the emulation engine instances perform a mesh test when an error or anomaly is detected. The mesh test diagnoses where the root of the detected error or anomaly occurs within the distributed platform architecture. Specifically, the mesh test involves a hierarchical test whereby the content stream under test is requested from different tiers within the distributed platform architecture until the source node for the error or anomaly is isolated.

Figure 6:
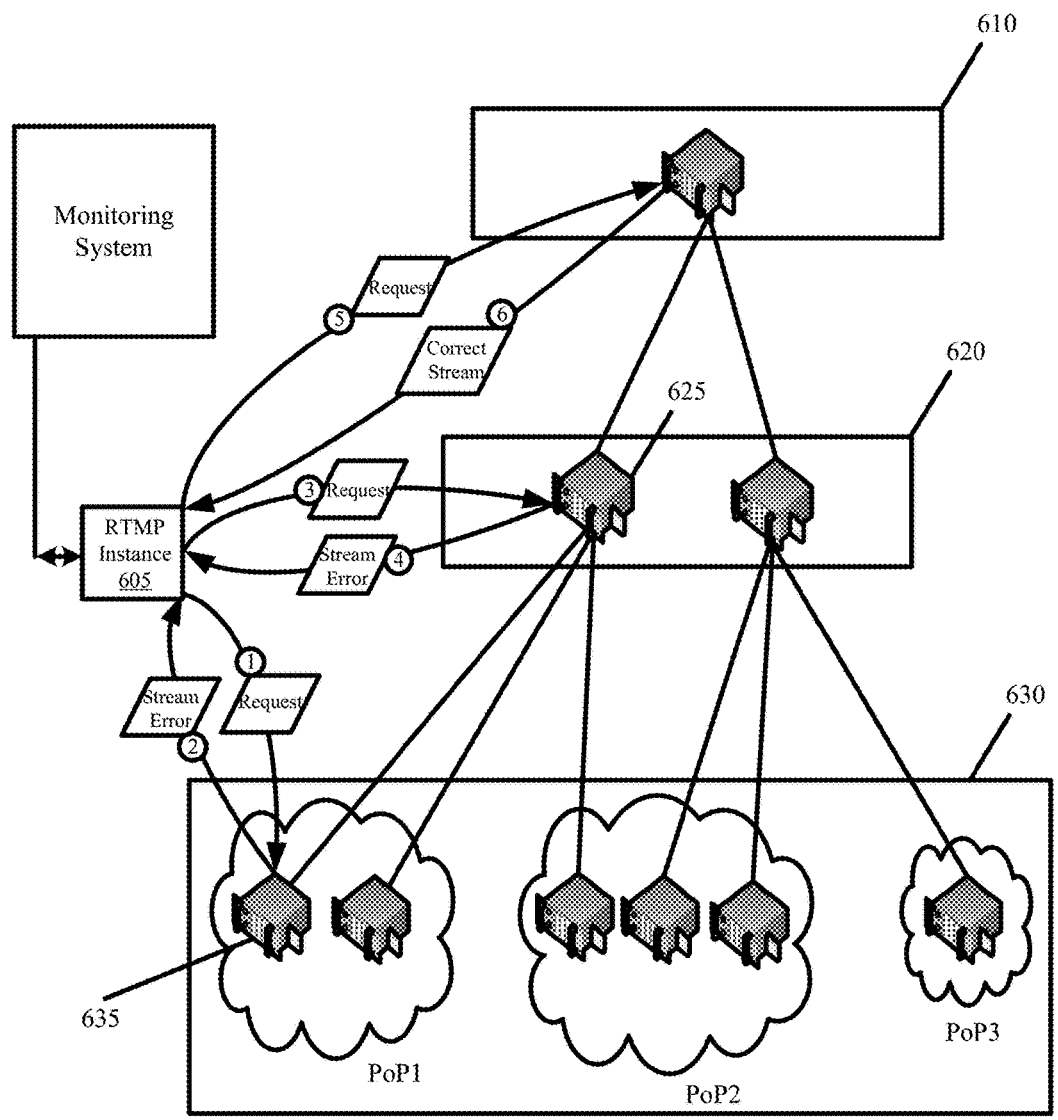
FIG. 6 conceptually illustrates mesh testing within a distributed platform as performed by an emulation engine instance in accordance with some embodiments.

FIG. 6 conceptually illustrates mesh testing within a distributed platform as performed by an emulation engine instance 605 in accordance with some embodiments. As shown, the distributed platform comprises three different tiers. A first tier of ingest servers 610 accepts a content stream that is published from an encoder or repeater and the first tier of ingest servers 610 makes the content stream available to the distributed platform by way of the a second tier of mid-tier servers 620. The second tier of mid-tier servers 620 internally distributes the published content stream from the first tier 610 to the third tier 630. The third tier 630 represents the streaming servers within the distributed platform PoPs that externally distribute the content stream to different users or clients. The third tier 630 streaming servers are sometimes referred to as edge servers because they provide the "last mile" delivery of the content streams to different sets of users. In other words, the third tier 630 streaming servers are located at various network edges so as to be geographically proximate to the different sets of users in order to deliver the content streams to the different sets of users with a minimal number of intervening network hops.

When the emulation engine instance 605 encounters an error or anomaly while monitoring streaming performance from a particular streaming server 635 operating in the third tier 630, the emulation engine instance 605 attempts to isolate where the error or anomaly originates by shifting the request up one tier to the second tier 620. Specifically, the emulation engine instance 605 requests the content stream from a mid-tier server 625 that provides the particular streaming server 635 with the content stream at issue. The emulation engine instance 605 then begins monitoring streaming performance of the mid-tier server 625.

If the error or anomaly is not detected while monitoring the mid-tier server 625 streaming performance, the emulation engine instance 605 determines that the error or anomaly is isolated or originates from the particular streaming server 635. If however, the error or anomaly persists while monitoring the mid-tier server's 625 streaming performance, the emulation engine instance 605 then shifts the request up one more tier to the first tier 610. In doing so, the emulation engine instance 605 requests the content stream under test and monitors streaming performance of an ingest server 615. Here again, based on persistence or absence of the original error or anomaly, the emulation engine instance 605 can isolate where the error or anomaly originates from within the distributed platform.

In FIG. 6, the emulation engine instance 605 correctly receives the content stream under test from the first tier 610, but encounters various errors when requesting and downloading the same content stream from the second tier 620 and the third tier 630. Based on these results, the emulation engine instance 605 is able to report that the error originates within the second tier 620. The emulation engine instance 605 can submit the findings via an alert to a user.

The mesh test presented by FIG. 6 illustrates one instance of an emulation engine instance performing a hierarchical testing of the distributed platform architecture. In some other embodiments, the system may instantiate a different emulation engine instance to test each tier of the distributed platform architecture. Based on the three tier architecture presented in FIG. 6, the system would initiate and simultaneously execute a first emulation engine instance to request the content stream under test from and monitor performance of the first tier, a second emulation engine instance to request the content stream under test from and monitor performance of the second tier, and a third emulation engine instance to request the content stream under test from and monitor performance of the third tier. This approach does away with the staggered hierarchical testing and instead tests all tiers simultaneously.

In some embodiments, the emulation engine instances perform multi-bitrate testing of content streams. A content stream that supports multi-bitrates is typically identified from the control input URL or from the manifest that is sent in response to a request for the content stream. The manifest identifies which bitrates are available for the content stream. When the emulation engine identifies a multi-bitrate content stream, the emulation engine instance can alternate the bitrate at which it requests different chunks of that content stream. The emulation engine instance can then monitor the server response to ensure that the server is responding correctly to the requested changes in bitrate. In some embodiments, the emulation engine instance submits multiple requests for the same content stream with each request identifying a different bitrate for the content stream. In such cases, the emulation engine instance monitors the streaming performance of the server to ensure that the content stream at each bitrate is correctly transferred.

In some embodiments, the monitoring system is implemented as a centralized system. In some such embodiments, one or more monitoring system machines monitor all PoPs of the distributed platform from a single location. In other words, when monitoring a particular content stream, a monitoring system machine of the centralized system instantiates and configures an emulation engine instance to monitor the particular content stream from each of the distributed platform PoPs.

In some embodiments, the monitoring system is implemented as a distributed set of machines. In some such embodiments, a monitoring system machine is collocated within or adjacent to each distributed platform PoP. Each machine is tasked with monitoring the streaming performance from the collocated or adjacent PoP. A designated master machine then collects the monitoring results from each other machine in order to generate the holistic reporting.

Figure 7:
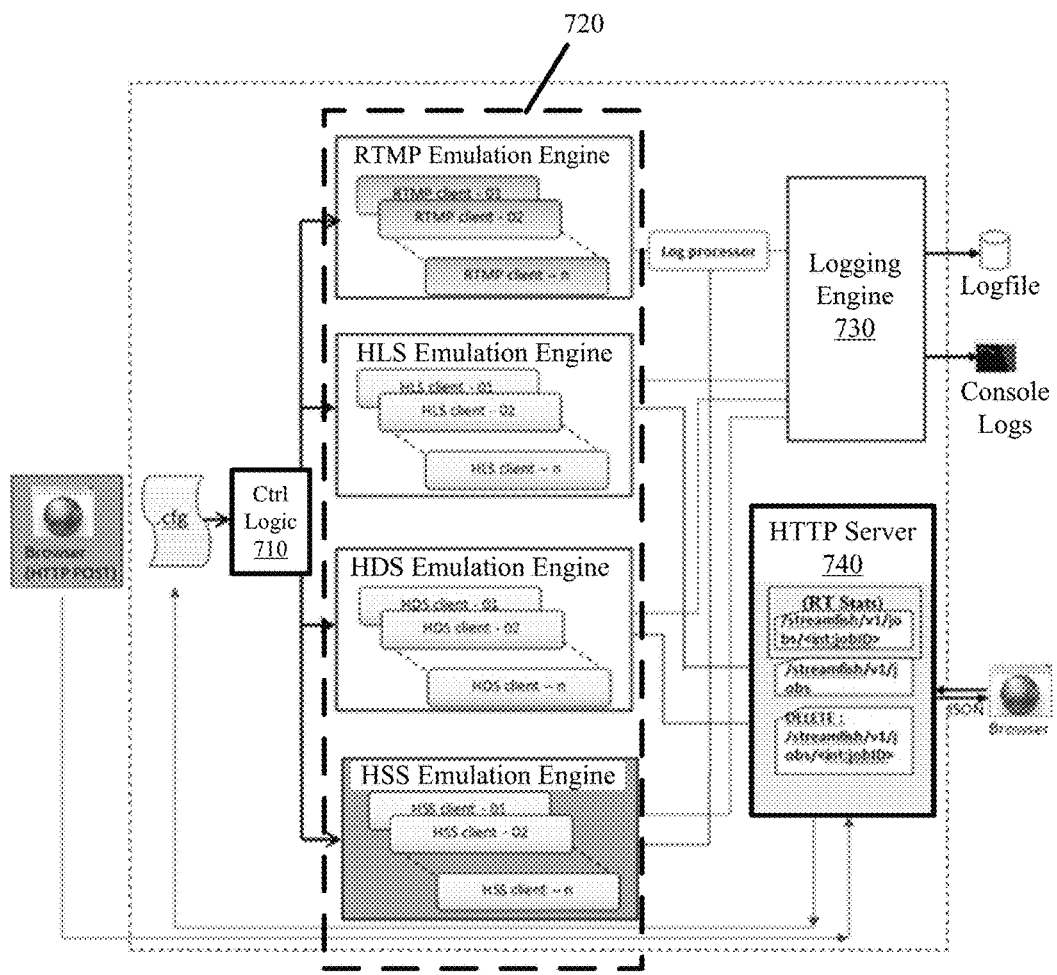
FIG. 7 conceptually illustrates a monitoring system machine of some embodiments.

FIG. 7 conceptually illustrates a monitoring system machine of some embodiments that operates with some of the hardware components described with reference to FIG. 8 below. The machine includes control logic 710, streaming protocol emulation engines 720, logging engine 730, and HTTP server module 740.

The control logic 710 controls the instantiation, configuration, and scheduling of the emulation engines 720 in response to received control input. As part of emulation engine instantiation, the control logic 710 identifies the streaming protocol for the content stream identified by the control input and retrieves or maintains the list of distributed platform delivery nodes where the particular content stream is available. Based on this information, the control logic 710 instantiates the correct number of emulation engines 720 of the correct streaming protocol type. As part of emulation engine configuration, the control logic 710 provides each instantiated emulation engine a content stream to monitor and addressing of a distributed platform node from which to monitor the content stream. Emulation engine configuration can further include identifying the error parameters and performance parameters to monitor, logging operations, and setting any alerts. As part of emulation engine scheduling, the control logic 710 sets the testing duration and testing interval for each instantiated emulation engine.

The machine is implemented with a different emulation engine 720 for each supported streaming protocol. Each implemented emulation engine 720 performs client-side player emulation for a specific streaming protocol as earlier described. In some embodiments, the machine is implemented with an emulation engine 720 for each of the HLS, HDS, HSS, and RTMP streaming protocols.

As per FIG. 5, the logging engine 730 aggregates the logs from each emulation engine 720 and receives any real-time updates of several metrics resulting from the stream monitoring. By parsing the aggregated logs, the logging engine 730 then produces a holistic report that details any errors that were encountered at any of the distributed platform delivery nodes while requesting and receiving a content stream under test. The holistic report also details performance related to delivery of the content stream under test from each of the distributed platform delivery nodes. The logging engine 730 also provides users with real-time updates when specified errors or performance statistics are detected while requesting and receiving a content stream under test. In the distributed monitoring system environment, the logging engine 730 from one of several deployed monitoring system machines can be designated to aggregate and compile a holistic report from the logging engines 730 of other monitoring system machines that are deployed to various PoPs.

The HTTP server 740 generates the various interfaces with which users interact with the monitoring system. This includes generating the interfaces by which users can provide control input and configuration parameters to specify which content streams to monitor, which parameters, errors, or issues to monitor for, and which, if any, notifications to generate. In some embodiments, the HTTP server module 740 further generates the interface by which users can view the monitoring results.

Many of the above-described processes, engines, modules, and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
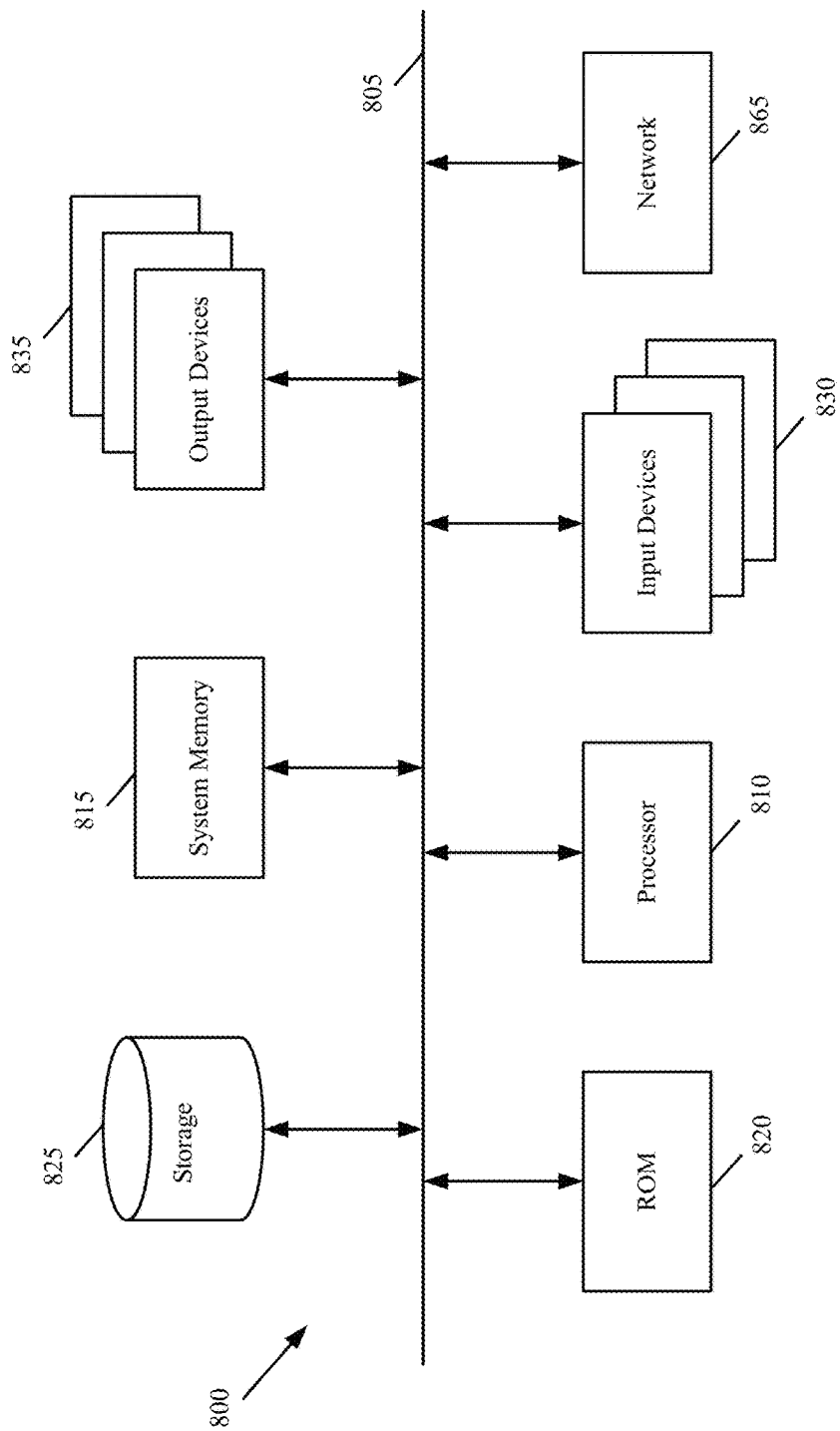
FIG. 8 illustrates a computer system or server with which some embodiments of the monitoring system are implemented.

FIG. 8 illustrates a computer system or server with which some embodiments of the monitoring system are implemented. Such a computer system includes various types of computer-readable mediums and interfaces for various other types of computer-readable mediums that implement the various methods and machines of the monitoring system described above. Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the embodiments described above. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments use a mass-storage device (such as a magnetic, solid-state disk, or optical disk and its corresponding disk drive) as the permanent storage device 825.

Other embodiments use a removable storage device (such as a flash drive or solid-state disk) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/ or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system comprising:
    a plurality of points-of-presence (PoPs), each PoP of the plurality of PoPs comprising at least one server with a processor and memory, the at least one server providing server-side streaming of a content stream according to a particular streaming protocol of a plurality of streaming protocols;
    at least one monitoring machine producing a plurality of emulation engines from execution of at least one processor, each emulation engine of the plurality of emulation engines performing client-side player emulation for a different streaming protocol of the plurality of streaming protocols, wherein the at least one monitoring machine instantiates a plurality of instances of an emulation engine from the plurality of emulation engines for client-side player emulation of the particular streaming protocol, and wherein, in response to said instantiating, each particular instance of the plurality of instances:
        parses a manifest received in response to issuing a request for the content stream from said particular instance to a different particular PoP of the plurality of PoPs,
        requests initial content stream chunks identified from said manifest,
        requests subsequent chunks identified from said manifest at a delayed rate in response to receiving the initial content stream chunks and emulating client player playback rate of the initial content stream chunks, and
        detects any error or anomaly associated with delivery of the content stream from the particular PoP based on sequential order verification and at least one of checksum, header, or payload verification of said initial and subsequent chunks.

2. The system of claim 1, wherein the plurality of streaming protocols comprise at least two of HyperText Transfer Protocol (HTTP) Live Streaming (HLS), HTTP Dynamic Streaming (HDS), HTTP Smooth Streaming (HSS), and Real Time Message Protocol (RTMP).

3. The system of claim 1, wherein the at least one monitoring machine comprises a machine that is deployed adjacent to or within each PoP of the plurality of PoPs.

4. The system of claim 1, wherein the at least one monitoring machine further monitors streaming performance across the plurality of PoPs by aggregating results from said client-side player emulation performed by each instance of the plurality of instances.

5. The system of claim 4, wherein the at least one monitoring machine further presents in one interface, streaming performance for all of the plurality of PoPs based on said aggregating.

6. The system of claim 1, wherein the at least one monitoring machine further identifies at least one PoP of the plurality of PoPs that suffers an error or issue in the server-side streaming of the content stream based on said detecting by the plurality of instances.

7. The system of claim 1, wherein the at least one monitoring machine further generates an alert identifying a PoP from the plurality of PoPs and a streaming error that occurs during the server-side streaming of the content stream from that PoP based on said detecting by the plurality of instances.

8. A method comprising:
    providing a plurality of emulation engines, each emulation engine of the plurality of emulation engines performing client-side player emulation for a different streaming protocol from a plurality of streaming protocols;
    receiving a Uniform Resource Locator (URL) comprising a request directed to a content stream from a distributed platform, a test duration, and an error threshold parameter, wherein the distributed platform comprises a plurality of locations from which the content stream is served;
    identifying based on the URL, a particular streaming protocol from a plurality of streaming protocols that the distributed platform uses to transmit the content stream;
    retrieving a plurality of addresses for directly addressing each location of the plurality of locations;
    instantiating a plurality of instances of an emulation engine from the plurality of emulation engines for client-side player emulation of the particular streaming protocol, wherein said instantiating comprises configuring each instance of the plurality of instances with the test duration of the URL, the error threshold parameter of the URL, and an address to a different location of the plurality of locations; and
    tracking streaming performance from each location of the plurality of locations in response to said instantiating, wherein said tracking comprises each instance of the plurality of instances (i) performing client-side player emulation of the content stream for said test duration with a particular location of the plurality of locations corresponding to the address configured for the particular instance and (ii) detecting errors or issues encountered during said performing based on server-side transmission of content stream chunks from the particular location violating said error threshold parameter.

9. The method of claim 8, wherein performing the client-side player emulation comprises requesting a first chunk of a plurality of chunks of the content stream from the address configured to the emulation engine instance and verifying receipt of the first chunk before requesting a second chunk of the plurality of chunks with a delay that emulates a rendering rate of the first chunk by a client application.

10. The method of claim 9, wherein performing the client-side player emulation excludes any of decoding and rendering any chunk of the plurality of chunks transmitted as part of the server-side transmission.

11. The method of claim 8, wherein said tracking further comprises each instance of the plurality of instances recording any errors or issues to a log file generated by the instance of the plurality of instances.

12. The method of claim 11, wherein said tracking further comprises collectively presenting the streaming performance provided by all of the plurality of locations for the content stream based on the log file generated by each instance of the plurality of instances.

13. The method of claim 8, wherein the plurality of addresses comprises Internet Protocol (IP) addresses for directly addressing a request for the content stream to each location of the plurality of locations.

14. The method of claim 8, wherein the plurality of streaming protocols comprises at least two of the HLS, HDS, HSS, and RTMP streaming protocols.

15. The method of claim 8, wherein said URL further comprises a test interval, and wherein said tracking comprises each instance of the plurality of instances performing the client-side player emulation for the test duration at each test interval.

16. A method for simultaneously monitoring a content stream from each of a plurality of points-of-presence (PoPs) of a distributed platform, the method comprising:
   obtaining an address for each PoP of the plurality of PoPs;
   requesting the content stream simultaneously from each PoP of the plurality of PoPs using the address obtained for each PoP of the plurality of PoPs;
   verifying any content stream manifests and initial content stream chunks that are received from each PoP of the plurality of PoPs in response to said requesting without any of rendering and decoding said chunks, wherein verifying any content stream manifests comprises inspecting said content stream manifests for at least one of formatting errors, missing fields, or invalid field values;
   identifying subsequent chunks of the content stream that remain undelivered from each PoP of the plurality of PoPs based on a manifest that is received from each PoP of the plurality of PoPs;
   requesting said subsequent chunks from each PoP of the plurality of PoPs at a delayed rate mimicking a rendering rate of a client application; and
   monitoring streaming performance from each PoP of the plurality of PoPs, wherein said monitoring comprises identifying any one or more PoPs of the plurality PoPs that fails to properly deliver a content stream chunk from said subsequent chunks.

17. The method of claim 16 further comprising generating a report identifying real-time streaming performance provided by each PoP of the plurality of PoPs based on said monitoring.

18. The method of claim 16, wherein requesting said subsequent chunks comprises requesting a different bitrate encoding for the subsequent chunks than for the initial content stream chunks.

19. The method of claim 16 further comprising automatically determining the content stream to test after the content stream is published to the distributed platform.

\* \* \* \* \*